United States Patent
Wang et al.

(10) Patent No.: US 9,363,069 B2
(45) Date of Patent: Jun. 7, 2016

(54) CLOCK GENERATING DEVICE AND RELATED SYNCHRONIZATION METHOD

(71) Applicant: NOVATEK Microelectronics Corp., Hsin-Chu (TW)

(72) Inventors: Chieh-Hao Wang, Hsinchu (TW); Wei-Jen Lo, Hsinchu (TW); Sen-Lin Kuo, Changhua County (TW); Pao-Chen Shih, Taichung (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 14/697,642

(22) Filed: Apr. 28, 2015

(65) Prior Publication Data

US 2015/0333900 A1    Nov. 19, 2015

Related U.S. Application Data

(60) Provisional application No. 61/992,914, filed on May 14, 2014.

(30) Foreign Application Priority Data

Jul. 4, 2014    (TW) .............................. 103123222 A

(51) Int. Cl.
*H03K 7/08* (2006.01)
*H04L 7/00* (2006.01)
*H04L 25/49* (2006.01)

(52) U.S. Cl.
CPC .......... *H04L 7/0016* (2013.01); *H04L 25/4902* (2013.01)

(58) Field of Classification Search
USPC ........................... 375/238; 327/160, 175, 271
See application file for complete search history.

(56) References Cited

U.S. PATENT DOCUMENTS

| | | | | |
|---|---|---|---|---|
| 6,020,773 A * | 2/2000 | Kan | ......................... | H03K 5/13 327/152 |
| 6,108,485 A * | 8/2000 | Kim | ................. | G11B 20/10009 348/423.1 |
| 7,113,053 B2 * | 9/2006 | Yoshikawa | .............. | G06F 1/025 327/175 |
| 7,535,957 B2 * | 5/2009 | Ozawa | .................... | H03L 7/087 348/530 |
| 8,362,819 B1 * | 1/2013 | Kris | ......................... | H03K 7/08 327/172 |
| 2005/0157418 A1 * | 7/2005 | Galbiati | ................. | G11B 21/12 360/75 |

(Continued)

FOREIGN PATENT DOCUMENTS

| | | |
|---|---|---|
| CN | 2722543 Y | 8/2005 |
| CN | 1799190 A | 7/2006 |

(Continued)

*Primary Examiner* — Eva Puente
(74) *Attorney, Agent, or Firm* — Winston Hsu; Scott Margo

(57) ABSTRACT

A clock generating device is disclosed. The clock generating device includes a clock generating unit, for counting a synchronization period of a synchronization signal, generating a first interrupt signal according to the synchronization signal, generating a pulse-width modulation signal according a control signal, counting a phase difference between the synchronization signal and the pulse-width modulation signal, and generating a second interrupt signal according to the pulse-width modulation signal; and a computing unit, for acquiring the synchronization period according to the first interrupt signal, acquiring the phase difference according to the second interrupt signal, and adjusting the control signal according to the synchronization period, a modulation period of the pulse-width modulation signal and the phase difference.

7 Claims, 4 Drawing Sheets

(56) References Cited

U.S. PATENT DOCUMENTS

| | | | |
|---|---|---|---|
| 2006/0250173 A1 | 11/2006 | Yang | |
| 2009/0184742 A1* | 7/2009 | Kris | H03K 7/08 327/160 |
| 2011/0119475 A1 | 5/2011 | Chen | |
| 2011/0121761 A1 | 5/2011 | Zhao | |
| 2013/0038227 A1* | 2/2013 | Yan | H05B 33/0818 315/186 |

FOREIGN PATENT DOCUMENTS

| | | |
|---|---|---|
| CN | 103401540 A | 11/2013 |
| TW | 201342808 | 10/2013 |

* cited by examiner

CLOCK GENERATING DEVICE AND RELATED SYNCHRONIZATION METHOD

CROSS REFERENCE TO RELATED APPLICATIONS

This application claims the benefit of U.S. Provisional Application No. 61/992,914, filed on May 14, 2014, the contents of which are incorporated herein in their entirety.

BACKGROUND OF THE INVENTION

1. Field of the Invention

The present invention relates to a clock generating device and related synchronization method, and more particularly, to a clock generating device capable of being realized by both hardware and software and related synchronization method.

2. Description of the Prior Art

In electronic systems, the clock offsets generally exist between the signal transmitting end and the signal receiving end. Thus, when the circuits in the electronic system transmit signal, the electronic system needs to synchronize the clock signal of each circuit, to allow the electronic system to work normally.

Generally, the conventional electronic system often uses the phase-locked loop (PLL) realized by hardware to synchronize the clock signals. However, the PLL realized by the hardware needs to consume significant time on performing the synchronization process, resulting in that the clock signal cannot be synchronized in a short time. In addition, the PLL realized by the hardware also cannot control the time of synchronizing the clock signal according to different operation states of the electronic system. As can be seen from the above, the prior art needs to be improved.

SUMMARY OF THE INVENTION

In order to solve the above problem, the present invention discloses a clock generating device capable of being realized by both hardware and software and related synchronization method.

In an embodiment, the present invention discloses a clock generating device. The clock generating device comprises a clock generating unit and a computing unit. The clock generating unit is utilized for counting a synchronization period of a synchronization signal, generating a first interrupt signal according to the synchronization signal, generating a pulse-width modulation signal according a control signal, counting a phase difference between the synchronization signal and the pulse-width modulation signal, and generating a second interrupt signal according to the pulse-width modulation signal. The computing unit is utilized for acquiring the synchronization period according to the first interrupt signal, acquiring the phase difference according to the second interrupt signal, and adjusting the control signal according to the synchronization period, a modulation period of the pulse-width modulation signal and the phase difference. Under such a condition, the clock generating device can synchronize the pulse width modulation signal and the synchronization signal in 2 periods of the synchronization signal.

In another embodiment, the present invention discloses a synchronization method for a clock generating device with a clock generating unit and a computing unit. The synchronization method comprises adjusting, by the computing unit, a pulse width modulation signal according to a synchronization period of a synchronization signal, a modulation period of the pulse-width modulation signal, and a phase difference between the synchronization signal and the pulse-width modulation signal. The pulse width modulation signal and the synchronization signal are synchronized in 2 periods of the synchronization signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
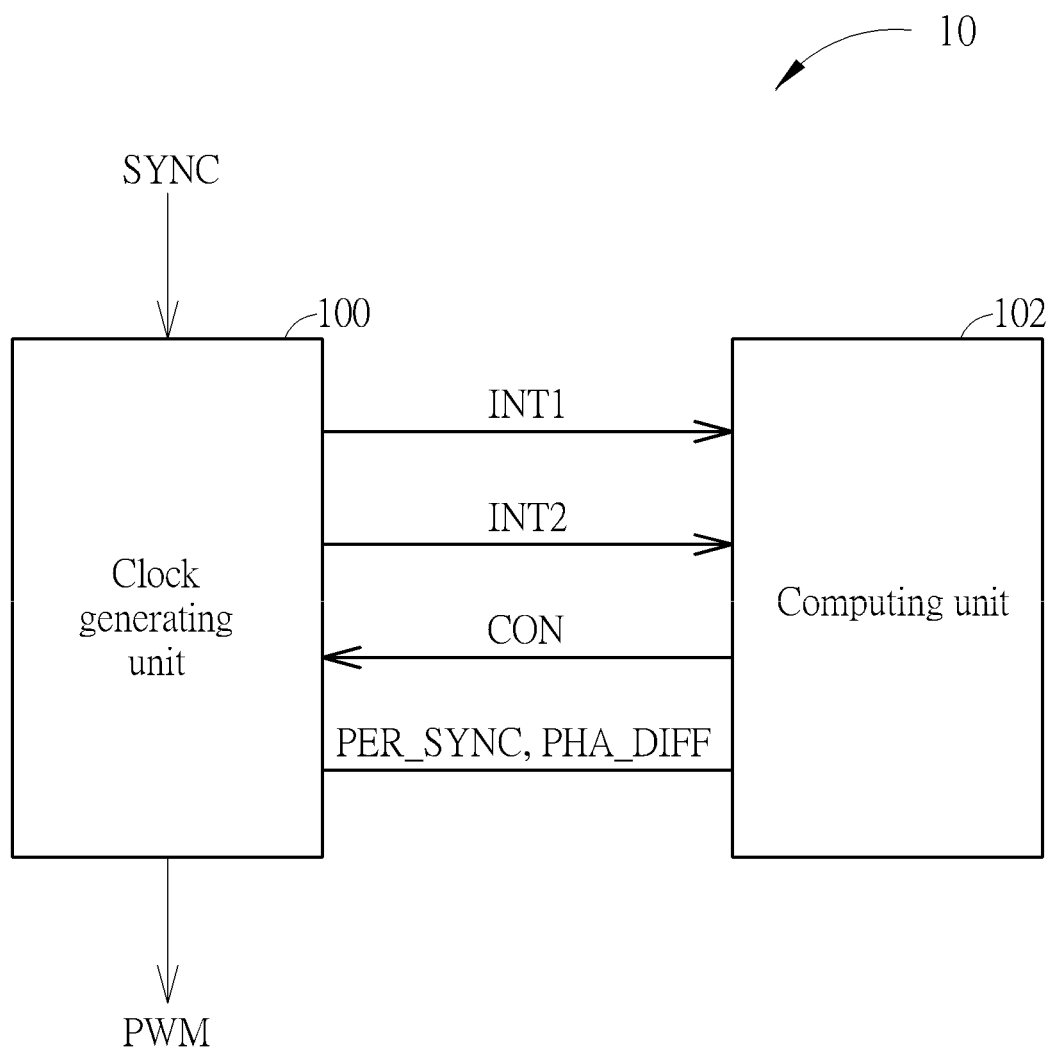
FIG. 1 is a schematic diagram of a clock generating device according to an embodiment of the present invention.

Please refer to FIG. 1, which is a schematic diagram of a clock generating device 10 according to an embodiment of the present invention. The clock generating device 10 is utilized for generating a pulse width modulation signal PWM according to a synchronization signal SYNC generated by a pre-stage circuit (not shown in FIG. 1), wherein the pulse width modulation signal PWM would be synchronized with the synchronization signal SYNC. As shown in FIG. 1, the clock generating device 10 comprises a clock generating unit 100 and a computing unit 102. The clock generating unit 100 is utilized for receiving the synchronization signal SYNC and generating the pulse width modulation signal PWM according to a control signal CON. The clock generating unit 100 is further utilized for counting a period PER_SYNC of the synchronization signal SYNC and a phase difference PHA_DIFF between the synchronization signal SYNC and the pulse width modulation signal PWM. The clock generating unit 100 generates interrupt signals INT1 and INT2 according to the synchronization signal SYNC and the pulse width modulation signal PWM and to the computing unit 102. The computing unit 102 may be a microprocessor or an application-specific integrated circuit (ASIC), and is utilized for acquiring the period PER_SYNC and the phase difference PHA_DIFF according to the interrupt signal INT1 and INT2. Based on the period PER_SYNC and the phase difference PHA_DIFF, the computing unit 102 adjusts the control signal CON to synchronize the pulse width modulation signal PWM and the synchronization signal SYNC. Since the operation process of adjusting the control signal CON is realized by software in the computing unit, the user can easily adjust a parameter setting of generating the control signal CON and control the synchronization process of the synchronization signal SYNC and the pulse width modulation signal (e.g. control the time of synchronizing the synchronization signal SYNC and the pulse width modulation signal) according to different applications and design concepts.

In details, the clock generating unit 100 counts the period PER_SYNC of the synchronization signal SYNC while receiving the synchronization signal SYNC from the pre-stage circuit. Via the interrupt signal INT1, the clock generating unit 100 indicates the computing unit 102 that the period PER_SYNC has been acquired, to instruct the computing unit 102 to access the period PER_SYNC of the synchronization signal SYNC from the clock generating unit 100. Next, the clock generating unit 100 generates the pulse width modulation signal PWM according to the control signal CON and counts the phase difference between the synchronization signal SYNC and the pulse width modulation signal PWM. Via the interrupt signal INT2, the clock generating unit 100 indicates the computing unit 102 that the phase difference PHA_DIFF has been acquired, to instruct the computing unit 102 to access the phase difference PHA_DIFF from the clock generating unit 100. Since a period PER_PWM of the pulse width modulation signal PWM and a starting time TS of the pulse width modulation signal PWM are set by the control signal CON generating by the computing unit 102, the computing unit 102 acknowledges the period PER_PWM. Next, the computing unit 102 adjusts the control signal CON according to the periods PER_SYNC, PER_PWM and the phase difference PHA_DIFF, to synchronize the synchronization signal SYNC and the pulse width modulation signal PWM.

As to the operation process of the computing unit 102 adjusts the control signal CON to synchronize the synchronization signal SYNC and the pulse width modulation signal PWM, please refers to the following descriptions. When an absolute value of the phase difference PHA_DIFF is greater than a predetermined value REF (i.e. |PHA_DIFF|>REF), the computing unit 102 determines that the frequency phase difference between the synchronization signal SYNC and the pulse width modulation signal PWM are enormous and performs a coarse-tuned process. In the coarse-tuned process, the computing unit 102 advances or delays the starting time TS of the pulse width modulation signal PWM according to the phase difference PHA_DIFF. In this embodiment, the computing unit 102 advances the starting time TS a predetermined time TP when the phase difference PHA_DIFF is greater than the predetermined value REF (i.e. PHA_DIFF>REF); and the computing unit 102 delays the starting time TS the predetermined time TP when the phase difference PHA_DIFF is smaller than the negative predetermined value REF (i.e. PHA_DIFF<-REF). For example, the predetermined value may be 2 milliseconds (ms) and the predetermined time TP may be 0.1 ms.

On the other hand, the computing unit 102 performs a fine-tuned process when the absolute value of the phase difference PHA_DIFF is smaller than or equal to the predetermined value REF (i.e. |PHA_DIFF|≤REF). In the fine-tuned process, the computing unit 102 counts a period difference PER_DIFF between the periods PER_SYNC and PER_PWM and adds a product of the period difference PER_DIFF and a weight W1 and a product of the phase difference PHA_DIFF and a weight W2 as a sum INC (i.e. INC=PER_DIFF×W1+PHA_DIFF×W2). After acquiring the sum INC, the computing unit 102 subtracts the sum INC from the starting time TS. According to the interrupt signal INT2, the computing unit 102 adjusts the control signal CON before the following pulse of the synchronization signal SYNC appears, to allow the clock generating unit 100 to generate the pulse width modulation signal PWM according to the control signal CON when the following pulse of the synchronization signal SYNC appears. As a result, the pulse width modulation signal PWM can be rapidly synchronized with the synchronization signal SYNC. In addition, the user may adjust the time of synchronizing the synchronization signal SYNC and the pulse width modulation signal PWM via adjusting the weights W1 and W2. For example, the weights W1 and W2 may be set as 0.25.

Figure 2:
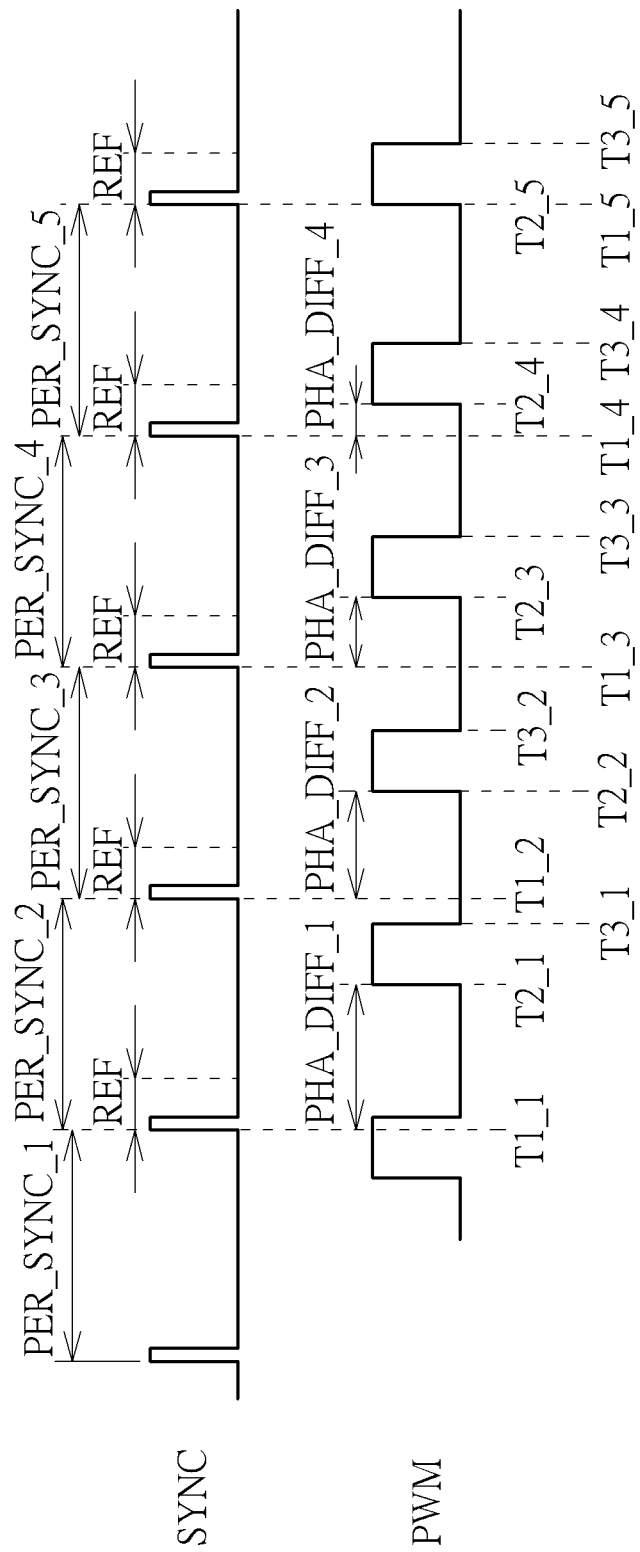
FIG. 2 is a timing diagram of related signals when the clock generating device shown in FIG. 1 operates.

Please refer to FIG. 2, which is a timing diagram of related signals when the clock generating device 10 shown in FIG. 1 operates. As shown in FIG. 2, the clock generating unit 100 receives a rising edge of the synchronization signal SYNC at a time T1_1 and indicates the computing unit 102 that a PER_SYNC_1 of a previous period of the synchronization signal SYNC is acquired via the interrupt signal INT1. The clock generating unit 100 also counts a phase difference PHA_DIFF_1 between the synchronization signal SYNC and the pulse width modulation signal PWM, simultaneously. At a time T2_1, the clock generating unit 100 generates a rising edge of the pulse-width modulation signal PWM and acquires the phase difference PHA_DIFF_1. Via the interrupt signal INT2, the clock generating unit 100 instructs the computing unit 102 to access the phase difference PHA_DIFF_1. According to the acquired PER_SYNC_1, the phase difference PHA_DIFF_1 and the period PER_PWM_1 set by the control signal CON, the computing unit 102 accordingly adjusts the control signal CON. Since the phase difference PHA_DIFF_1 is greater than the predetermined value REF, the computing unit 102 decreases the predetermined time TP from the starting time TS of the pulse width modulation signal PWM via adjusting the control signal CON. Note that, the computing unit 102 performs the adjustment of the control signal CON at the falling edge of the pulse width modulation signal PWM (i.e. a time $T3_{1\_1}$) according to the interrupt signal INT2.

Similarly, the clock generating unit 100 receives a rising edge of the synchronization signal SYNC at a time $T1_{1\_2}$ and indicates the computing unit 102 that a PER_SYNC_2 of a previous period of the synchronization signal SYNC is acquired via the interrupt signal INT1. The clock generating unit 100 also simultaneously counts a phase difference PHA_DIFF_2 between the synchronization signal SYNC and the pulse width modulation signal PWM. At a time T2_2, the clock generating unit 100 generates a rising edge of the pulse-width modulation signal PWM and acquires the phase difference PHA_DIFF_2. Via the interrupt signal INT2, the clock generating unit 100 instructs the computing unit 102 to access the phase difference PHA_DIFF_2. Since the phase difference PHA_DIFF_2 is still greater than the predetermined value REF, the computing unit 102 decreases the predetermined time TP from the starting time TS of the pulse width modulation signal PWM via adjusting the control signal CON, and so on.

Till a time T2_4, the computing unit 102 determines the phases difference PHA_DIFF_4 is smaller than the predetermined value REF. The computing unit 102 therefore calculates the sum INC of the product of the period difference PER_DIFF and the weight W1 and the product of the phase difference PHA_DIFF_4 and the weight W2, and subtracts the sum INC from the starting time TS. As a result, the pulse width modulation signal PWM can be synchronized with the synchronization signal SYNC when the next pulse of the synchronization signal SYNC generates (i.e. a time $T1_{1\_5}$).

Figure 3:
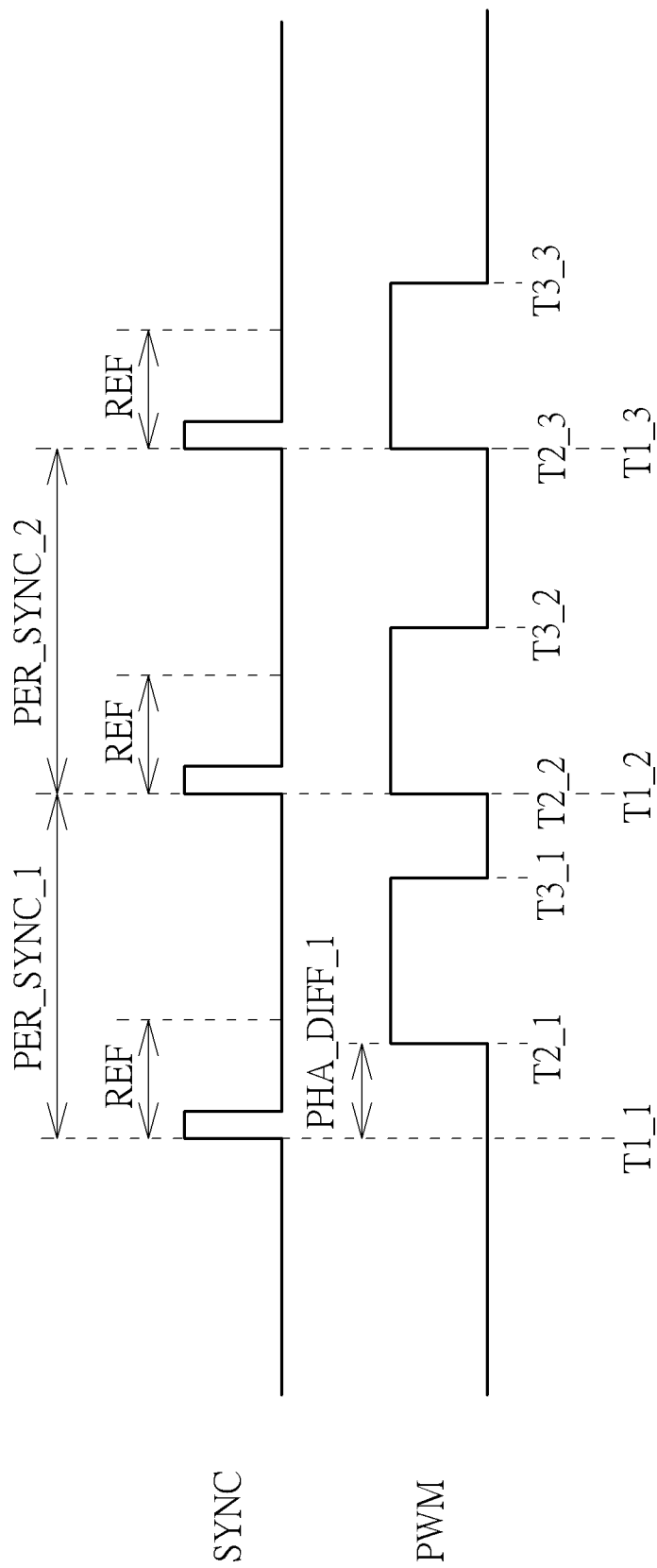
FIG. 3 is another timing diagram of related signals when the clock generating device shown in FIG. 1 operates.

Via setting the predetermined value REF and the weights W1 and W2 appropriately, the pulse width modulation signal PWM can be synchronized with the synchronization signal SYNC in 2 periods of the synchronization signal SYNC. Please refer to FIG. 3, which is a timing diagram of related signals when the clock generating device 10 shown in FIG. 1 operates. Similarly to FIG. 2, the clock generating unit 100 receives a rising edge of the synchronization signal SYNC at the time T1_1 and indicates the computing unit 102 that a PER_SYNC_1 of a previous period of the synchronization signal SYNC is acquired via the interrupt signal INT1. The clock generating unit 100 also counts a phase difference PHA_DIFF_1 between the synchronization signal SYNC and the pulse width modulation signal PWM, simultaneously. At the time $T2_{1\_1}$, the clock generating unit 100 generates a rising edge of the pulse-width modulation signal PWM and acquires the phase difference PHA_DIFF_1. Via the interrupt signal INT2, the clock generating unit 100 instructs the computing unit 102 to access the phase difference PHA_DIFF_1. Since the phase difference PHA_DIFF_1 is smaller than the predetermined value REF in this embodiment, the computing unit 102 calculates the sum INC of the product of the period difference PER_DIFF and the weight W1 and the product of the phase difference PHA_DIFF_1 and the weight W2, and subtracts the sum INC from the starting time TS. Via adjusting the control signal CON at the time T31, the rising edge of the pulse width modulation signal PWM aligns the rising edge of the synchronization signal SYNC at the time $T1_{13}2$. As a result, the computing unit 102 acknowledges the phase difference PHA_DIFF is 0 at the time T1_3 and the pulse width modulation signal PWM has been synchronized with the synchronization signal SYNC.

Figure 4:
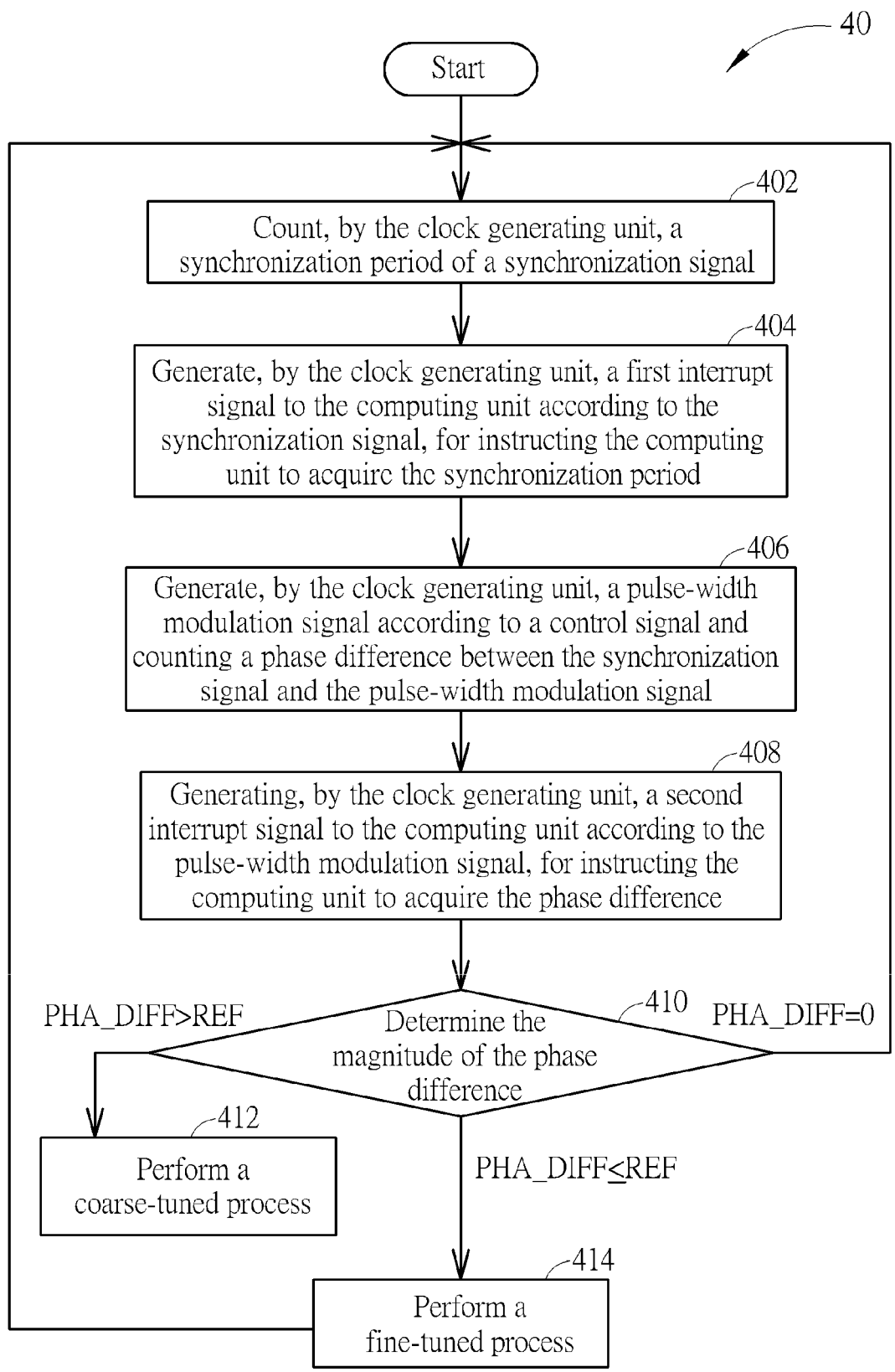
FIG. 4 is a flowchart of a synchronization method according to an embodiment of the present invention.

The process of the clock generating device 10 synchronizes the pulse width modulation signal PWM and the synchronization signal SYNC can be summarized into a synchronization method 40 shown in FIG. 4. The synchronization method 40 can be utilized in a clock generating device with a clock generating unit and a computing unit (e.g. the clock generating device 10 shown in FIG. 1) and comprises the following steps:

Step 400: Start.

Step 402: Count, by the clock generating unit, a synchronization period of a synchronization signal.

Step 404: Generate, by the clock generating unit, a first interrupt signal to the computing unit according to the synchronization signal, for instructing the computing unit to acquire the synchronization period.

Step 406: Generate, by the clock generating unit, a pulse-width modulation signal according to a control signal and counting a phase difference between the synchronization signal and the pulse-width modulation signal.

Step 408: Generating, by the clock generating unit, a second interrupt signal to the computing unit according to the pulse-width modulation signal, for instructing the computing unit to acquire the phase difference.

Step 410: Determine the magnitude of the phase difference, perform step 412 when the absolute value of the phase difference is greater than a predetermined value; perform step 414 if the absolute value of the phase difference is smaller than or equal to the predetermined value; and perform step 402 when the phase difference is 0.

Step 412: Perform a coarse-tuned process.

Step 414: Perform a fine-tuned process.

According to the synchronization method 40, the clock generating device can synchronize the pulse width modulation signal and the synchronization signal in 2 periods of the synchronization signal. Via appropriately designing the predetermined value and the weights corresponding to the phase difference and the period difference, the user can flexibly control the time of synchronizing the pulse width modulation signal and the synchronization signal. The detail operations of the synchronization method 40 can be referred to the above, and are not narrated herein for brevity.

To sum up, the clock generating device in the above embodiments utilizes the interrupt signal to control the computing unit of the clock generating device to perform the parameters calculations by the software, to synchronize the pulse width modulation signal generating by the clock generating device and the synchronization signal generated by the pre-stage circuit. The time of the clock generating device performs the synchronization process can be optimized and can be adjusted according to different applications and design concepts.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clock generating device, comprising:
a clock generating unit, for counting a synchronization period of a synchronization signal, generating a first interrupt signal according to the synchronization signal, generating a pulse-width modulation signal according a control signal, counting a phase difference between the synchronization signal and the pulse-width modulation signal, and generating a second interrupt signal according to the pulse-width modulation signal; and
a computing unit, for acquiring the synchronization period according to the first interrupt signal, acquiring the phase difference according to the second interrupt signal, and adjusting the control signal according to the synchronization period, a modulation period of the pulse-width modulation signal and the phase difference.

2. The clock generating device of claim 1, wherein the clock generating unit performs a coarse-tuned process when an absolute value of the phase difference is greater than a predetermined value.

3. The clock generating device of claim 2, wherein the clock generating unit adjusts the control signal when the phase difference is greater than the predetermined value, to decrease a starting time of the pulse-width modulation signal.

4. The clock generating device of claim 2, wherein the clock generating unit adjusts the control signal when the phase difference is smaller than the negative predetermined value, to increase a starting time of the pulse-width modulation signal.

5. The clock generating device of claim 1, wherein when the absolute value of the phase difference is smaller than or equal to a predetermined value, the clock generating unit counts a period difference between the synchronization period and the modulation period; calculates a first product of the period difference and a first weight; calculates a second product of the phase difference and a second weight; acquires a sum of the first product and the second product; and adjusts the control signal, to substrate the sum from a starting time of the pulse-width modulation signal.

6. The clock generating device of claim 1, wherein the synchronization signal is transmitted from a pre-stage circuit to the clock generating unit.

7. The clock generating device of claim 1, wherein the clock generating unit acquires a time difference between a rising edge of the synchronization signal and a following rising edge of the pulse-width modulation signal as the phase difference.

* * * * *